March 7, 1933.  E. W. K. ROE  1,900,304
SAW OPERATING MECHANISM
Filed May 31, 1928   2 Sheets-Sheet 2
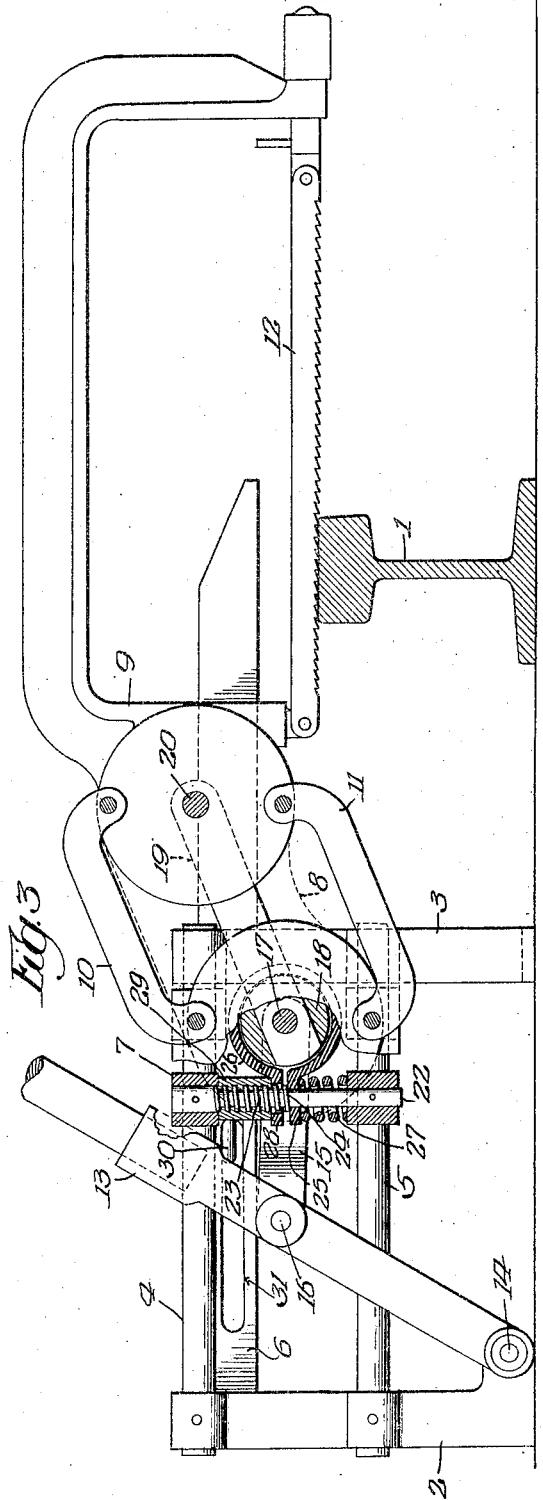
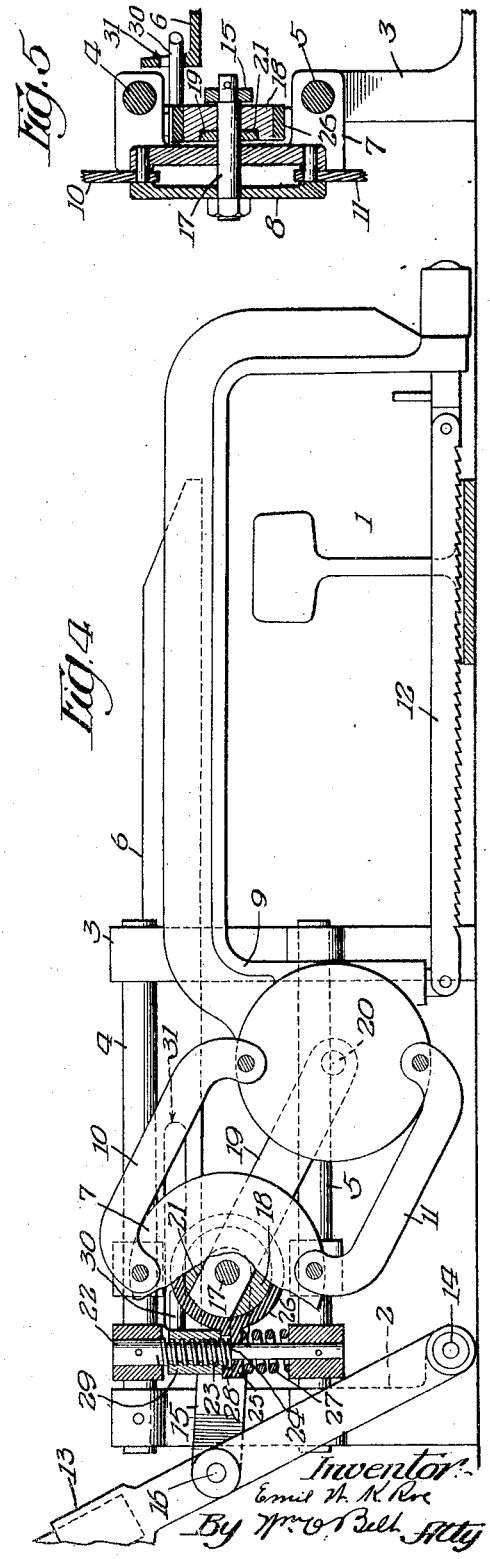
Inventor
Emil W. K. Roe
By Wm O Bell Atty Patented Mar. 7, 1933

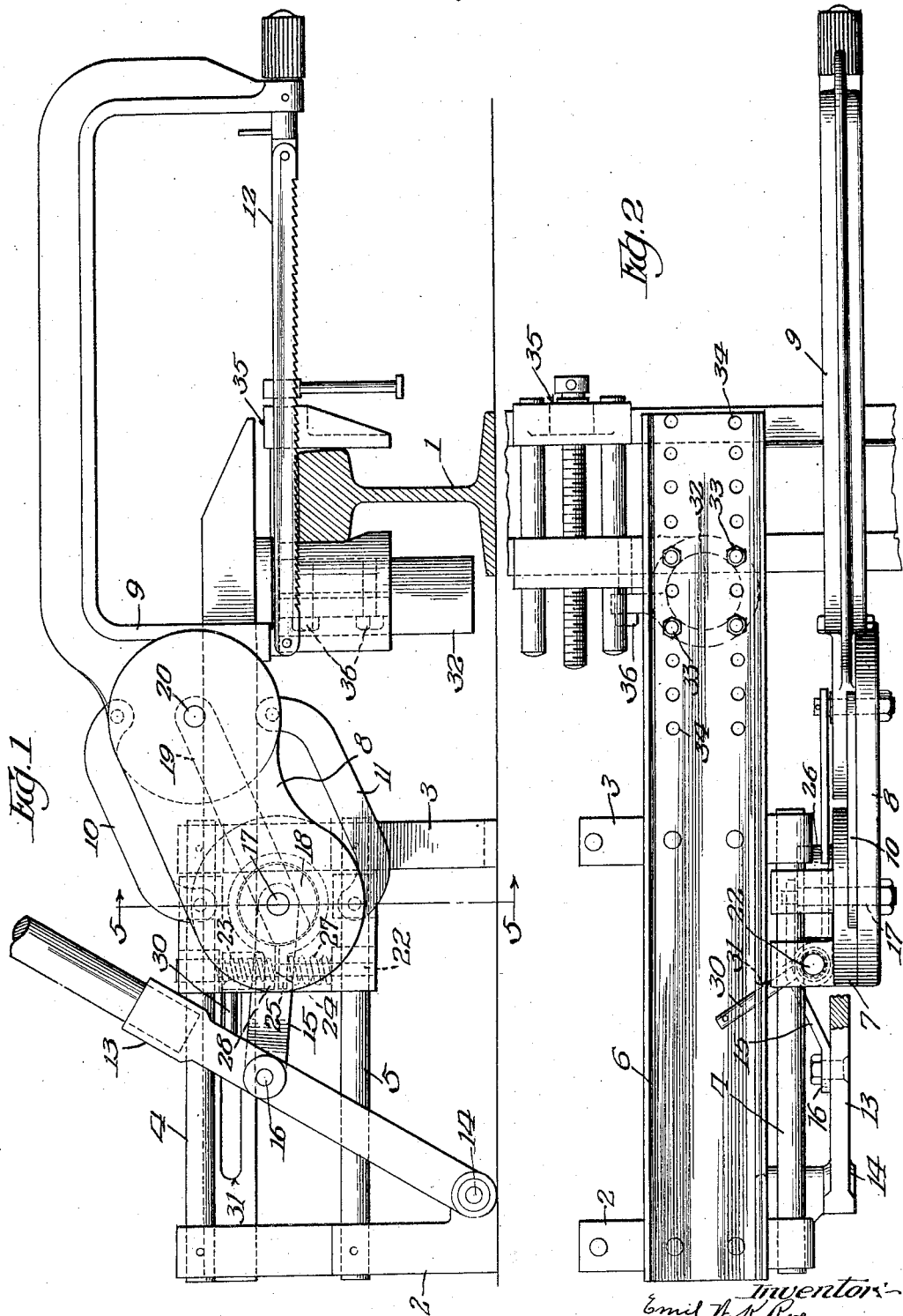

1,900,304

UNITED STATES PATENT OFFICE

EMIL W. K. ROE, OF CHICAGO, ILLINOIS, ASSIGNOR TO THE ALDON COMPANY, OF CHICAGO, ILLINOIS, A CORPORATION OF ILLINOIS

SAW OPERATING MECHANISM

Application filed May 31, 1928. Serial No. 281,728.

This invention relates to saw operating mechanism and is particularly adaptable for use with rail saws.

The object of the invention is to provide new and improved mechanism for maintaining the saw in proper horizontal position relative to the work.

Another object is to provide novel means for raising the saw from the work on the return stroke of the saw to prevent the saw blade from bearing on the work in the return stroke.

And another object is to provide novel means of simple construction for locking and raising the saw on its return movement and for releasing the same on the cutting stroke.

In the accompanying drawings illustrating a selected embodiment of the invention, the views are as follows:

Fig. 1 is a side elevation of a saw embodying the invention.

Fig. 2 is a top plan view.

Fig. 3 is a side elevation partly in section showing the saw in normal or cutting position.

Fig. 4 is a similar view showing the saw in non-cutting position.

Fig. 5 is a detail cross section on the line 5—5 of Fig. 1.

Referring to the drawings, 1 designates a section of a rail which has been selected as an illustration of the work on which the saw may operate, it being understood, of course, that the invention is not limited to use with means for sawing a rail.

A plurality of brackets 2 and 3, supporting a plurality of longitudinally extending rods 4 and 5, are connected to a longitudinal support 6, and comprise a frame. A cross-head 7 is slidably supported on the rods 4 and 5 and carries a link 8 which is pivoted to the cross-head and also to the saw frame 9. The link 8 is rigid and relatively wide to prevent wabbling or lateral movement of the saw frame. Parallel rods 10 and 11 preserve the saw 12 in a succession of parallel positions as it descends.

An operating lever 13 is pivoted to the standard 2 at 14 and has an arm 15 pivoted thereto at 16 which is also pivotally mounted on a stud or shaft 17 mounted to the cross-head. A brake-drum 18 is pivoted on the stud 17, and a connecting rod 19 pivoted to the saw frame at 20 is received in a slot 21 in the drum and is pivoted to the stud 17. A vertical pin 22 is fixed in the cross-head and is threaded at its upper end at 23. This pin is provided with a shoulder 24 against which the lower arm 25 of the brake-band 26 bears, being forced upwardly by the spring 27. The upper arm 28 of the brake-band slides on the threaded end 23 of the vertical stud 22. A nut or operating member 29 is threaded to the portion 23 of the pin 22 and is provided with an arm 30 which is received in a longitudinal slot 31 in the longitudinal support 6.

A tubular support 32, Figs. 1 and 2, is adjustably secured to the horizontal support 6 by means of bolts 33 passing through any one of a number of apertures 34 in the support 6. A work clamp 35 is mounted on the support 32 and held in fixed position on the support 32 by the bolts 36. This clamp and its cooperating parts are shown and described in my copending application Serial No. 5,934, filed January 31, 1925.

In operation, the device is placed in position adjacent the work, such as a rail, and the work is engaged by the clamp 35. When the lever 13 is operated, the cross-head 7 will be reciprocated on the longitudinal rods 4 and 5 and cause horizontal reciprocation of the saw 12. The saw is designed to cut on its rearward, or pulling stroke, and is raised from the work on its forward, or pushing stroke. During the pulling stroke, or rearward movement of the saw, it is maintained in proper horizontal position by the parallel rods 10 and 11, and the parts are free to bear down on the work so that the full weight of the saw frame and its cooperating parts provide the necessary cutting pressure required for work of this kind. To save wear on the saw, it is desirable and practical that the saw be raised from the work during the return stroke and all pressure relieved therefrom. As the operating lever 13 approaches the end of its cutting stroke, the arm 30 will strike the edge of the slot 31 in the standard 6 and rotate the nut 29 on the threaded end 23 of the pin 22. As the nut rotates and moves down, it forces the arm 28 of the band 26 downwardly until it strikes the lower brake-band arm 25 and tightens the band 26 on the drum 18 so that the saw frame 9 will be substantially rigid with the cross-head 7. Further forward movement of the operating lever 7 causes further downward movement of the nut 29 and forces both of the arms 25 and 28 downward to depress the spring 27 and raise the rod 19 which raises the saw frame 9 a slight distance but sufficient to raise the cutting edge of the saw from the work. Upon forward, or pushing movement of the operating lever 13, the parts will remain in raised and locked position until the arm 30 strikes the end of the slot 31 and rotates the nut 29 and lowers the saw to normal cutting position. Further forward movement of the operating lever causes the arm 30 to loosen the nut on the threaded end 23 and releases the brake-band from the drum so that the parts will again be released and the weight of the saw frame will bear on the work for normal cutting operation.

The invention provides a saw composed of few and simple parts which positively maintain the saw in proper horizontal position during the cutting operation. The parts are locked together to hold the saw in rigid position when the saw has reached the end of its cutting stroke and then raises the saw from the work during the return or non-cutting movement of the saw. When the parts are locked together and in rigid position it is an easy matter to replace blades in the saw frame and the operator will not be required to hold the frame when the blades are changed.

Changes may be made in the form, construction and arrangement of the parts without departing from the spirit of the invention or sacrificing any of its advantages and the right is hereby reserved to make all such changes as fairly fall within the scope of the following claims.

I claim:

1. A saw operating mechanism comprising a frame, a cross-head slidable on said frame, a saw frame, means pivotally connecting the saw frame to the cross-head, means for maintaining said saw frame in horizontal position as it moves to and from the work, a lever for actuating said cross-head whereby a reciprocatory movement may be imparted to said saw frame, brake means and means for operating the brake means and movable with the saw frame to be operable in any position into which the saw frame is raised or lowered, said brake means including parts mounted on the cross-head and parts connected to the saw frame whereby when said brake means is operated to prevent movement thereof the saw frame is raised to lift a saw in the frame from engagement with the work.

2. A saw operating mechanism comprising a frame, a cross-head reciprocable on said frame, means to actuate the cross-heads, a saw frame, a link pivotally connecting the cross-head and the saw frame, parallel rods pivoted to the cross-head and the saw frame to maintain said frame in horizontal position during the saw cutting operation, a brake drum on the cross-head and connected to the saw frame, brake means engageable with said brake drum to limit movement thereof, and operating means for engaging said brake means with said brake drum on a non-cutting operation of the saw frame to raise the saw in the saw frame from the work and permitting disengagement of said brake means from said brake drum on a cutting operation of said saw frame and permitting engagement of the saw in the saw frame with the work.

3. A saw operating mechanism comprising a frame, a cross-head slidable on said frame, means to reciprocate said cross-head, a saw frame movable relatively to the cross-head for adapting the saw to its progress through the work, a link pivotally connecting the cross-head and the saw frame, means for maintaining the saw frame in horizontal position during its relative movement, means for locking the saw frame to the cross-head whereby said saw frame will be rigid with said cross-head, and means operable from the means reciprocating said cross-head for operating said locking means and for raising the saw frame during the non-cutting operation of the saw in said saw frame.

4. A saw operating mechanism comprising a frame, a cross-head slidable on said frame, means to actuate the cross-head, a saw frame, means connecting the cross-head and saw frame to maintain said frame in horizontal position during cutting operations, a drum rotatably mounted in said cross-head, a brake for said drum, means for actuating the brake, and means operated by said drum and pivoted to the saw frame for intermittently locking the saw frame to the cross-head.

5. A saw operating mechanism comprising a frame, a cross-head slidable on said frame, means to actuate the cross-head, a saw frame, means pivotally connecting the cross-head and saw frame to maintain said frame in horizontal position during cutting operations, a drum rotatably mounted in said cross-head and connected to said saw frame, a brake-band for said drum, a member having a threaded portion and mounted at its ends in said cross-head for actuating said brake-band to hold the drum against movement, a nut on the threaded end of said member and engageable with the brake band to operate the same, and an arm for operating the nut.

6. A saw operating mechanism comprising a frame, a cross-head slidable on said frame, means to actuate the cross-head, a saw frame, means pivotally connecting the cross-head and saw frame to maintain the saw frame in horizontal cutting position, a drum rotatably mounted in said cross-head and connected to said saw frame, a brake-band for said drum, a member having a threaded portion and mounted at its ends in said cross-head and engaging said brake-band, a nut on the threaded portion of said member and engageable with the brake band to operate the same, and an arm on said nut and slidable in a slot in the first named frame and engaging the ends of the slot in succession to lock the frame to the cross-head to raise the frame during movement thereof in one direction and to release the frame during movement thereof in the other direction.

7. A saw operating mechanism comprising a frame, a cross-head slidable on said frame, means to actuate the cross-head, a saw frame, means pivotally connecting the cross-head and saw frame to maintain the saw frame in horizontal cutting position, a drum rotatably mounted in said cross-head and connected to said saw frame, a member having a threaded portion and mounted at its ends in said cross-head, a brake-band for said drum and having a pair of arms, a shoulder on said member and engaging one of said arms, a spring for maintaining said arm against said shoulder, a nut threadedly engaging the member and adapted to operate on said other brake-band arm, an arm on said nut and engaging a slot in said first named frame for intermittently tightening the band on the drum to lock the saw frame to the cross-head.

8. A saw operating mechanism comprising a frame, a cross-head slidable on said frame, means to actuate the cross-head, a saw frame, means pivotally connecting the cross-head and saw frame to maintain the frame in horizontal cutting relation to the work, a drum rotatably mounted in said cross-head, a pin having a threaded portion and mounted at its ends in said cross-head, a brake-band for said drum and having a pair of arms, a shoulder on said pin and engaging one of said arms, a spring for maintaining said arm against said shoulder, a nut threadedly engaging the pin and adapted to operate on said arm, an arm on said nut and slidable in a slot in said first named frame, a rod recessed in said drum and pivoted to said saw frame whereby the last named arm will engage one end of the slot and rotate the nut to tighten the brake-band on the drum at a predetermined position and then depress both of said brake-band arms and said spring to raise said last named rod and the saw frame, said nut being released to permit the parts to return to normal position when the arm on the nut has engaged the other end of the slot.

9. A saw operating mechanism comprising a frame, a cross-head slidable on said frame, means to actuate the cross-head, a saw frame, means pivotally connecting the saw frame and the cross-head, means for maintaining the saw frame in horizontal position as it descends during the cutting operation, means including a brake drum mounted on the cross head and a part connecting the brake drum and the saw frame, brake means engageable with the brake drum to limit movement thereof, and operating means for engaging said brake means with said brake drum on a non-cutting operation of the saw frame to raise the saw in the saw frame from the work and permitting disengagement of said brake means from said brake drum on a cutting operation of said saw frame and permitting engagement of the saw in the saw frame with the work.

EMIL W. K. ROE.